United States Patent [19]

Ames

[11] Patent Number: 4,567,223
[45] Date of Patent: Jan. 28, 1986

[54] POLYOLEFIN CONTAINING HOT-MELT ADHESIVES HAVING SHORT SET TIME AND BOTH GOOD LOW AND HIGH TEMPERATURE BOND STRENGTH PROPERTIES

[75] Inventor: William A. Ames, Longview, Tex.

[73] Assignee: Eastman Kodak Company, Rochester, N.Y.

[21] Appl. No.: 646,189

[22] Filed: Aug. 31, 1984

[51] Int. Cl.$^4$ .................. C08L 23/14; C08L 23/06; C08L 23/26; C08L 51/06

[52] U.S. Cl. .................. 524/489; 525/193; 525/240; 525/210; 525/78; 525/74; 525/75; 524/489; 524/491

[58] Field of Search ............ 525/74, 240; 524/491, 524/489

[56] References Cited

U.S. PATENT DOCUMENTS

| | | | |
|---|---|---|---|
| 3,483,276 | 12/1969 | Mahlman | 525/74 |
| 3,701,760 | 10/1972 | Hagemeyer et al. | 525/327.9 |
| 3,862,265 | 1/1975 | Steinkamp et al. | 525/192 |
| 3,987,122 | 10/1976 | Bartz et al. | 525/240 |
| 4,169,116 | 9/1979 | Trotter et al. | 525/232 |
| 4,237,037 | 12/1980 | Takahashi | 525/74 |
| 4,259,470 | 3/1981 | Trotter et al. | 526/348.2 |
| 4,288,358 | 9/1981 | Trotter et al. | 525/232 |

*Primary Examiner*—Carman J. Seccuro
*Attorney, Agent, or Firm*—William P. Heath, Jr.; Clyde L. Tootle

[57] ABSTRACT

The hot-melt adhesives of the present invention comprise a blend of at least one propylene/$C_4$ to $C_{10}$ higher 1-olefin copolymer having an acid number of at least 5, a tackifying resin, and a high density, low viscosity polyethylene wax having a melt viscosity of about 5 to 50 cp. at 150° C. This hot-melt adhesive has a novel combination of properties including low melt viscosity and fast setting which meet the requirements necessary for use in rapid bonding or closing in low and high temperature applications.

8 Claims, No Drawings

POLYOLEFIN CONTAINING HOT-MELT ADHESIVES HAVING SHORT SET TIME AND BOTH GOOD LOW AND HIGH TEMPERATURE BOND STRENGTH PROPERTIES

DESCRIPTION

This invention relates to polyolefin containing hot-melt adhesives. One aspect of this invention concerns a polyolefin containing hot-melt adhesive having a novel combination of properties. Another aspect of this invention concerns a polyolefin containing hot-melt adhesive that has good adhesive properties and can be used in rapid bonding or closing operations to provide adhesives having both good low and high temperature bond strength.

Hot-melt adhesives are widely used in industry for various applications such as in product assembly. For example, one such application is in the packaging industry in the fabrication of corrugated paperboard and also for use in cardboard case sealing and carton closing operations. The adhesive is generally applied by a hot-melt applicator which consists of a reservoir for the adhesive, heating means for melting the adhesive and maintaining it in a molten state, and means for applying the adhesive for a particular end use.

The rate at which the adhesive can be applied is primarily a function of the melt viscosity of the adhesive, i.e., the lower the viscosity the faster the rate of application. In order to increase production rates it has been in the past necessary to operate at higher temperatures to reduce the melt viscosity of the adhesive. This often degrades the adhesive which is undesirable. The melt viscosity of polyolefin-based hot-melt adhesives can be reduced, but this generally adversely affects the adhesive bond strength. Another important property of an adhesive is set time which must be less than 10 seconds if the adhesive is to be used in fast line speeds. Since the packaging industry is continually increasing the speed of operation of their case and carton sealing operations, it would be an advance in the state of the art to provide another hot-melt polyolefin containing adhesive having the necessary low melt viscosity and fast set times to be useful in rapid bonding or sealing cartons to provide bonds having good bond strengths including good bond strengths at both low and high temperatures.

In accordance with the present invention, it has been found that a blend comprising at least one propylene/$C_4$ to $C_{10}$ higher 1-olefin copolymer having an acid number of at least 5, a tackifying resin, and a high density, low viscosity polyethylene wax having a molecular weight of at least about 1000 provides a hot-melt adhesive having a novel combination of properties including low melt viscosity, fast set times and provides bonds having both good low and high temperature bond strengths.

The modified propylene/higher olefin copolymers have a melt viscosity of 1,500 to 20,000 centipoise at 177° C., preferably 2,500 to 15,000, and contain 95 to 70 mole percent propylene. The unmodified propylene/higher olefin copolymers are prepared by processes well known in the art. For example, U.S. Pat. No. 4,259,470 discloses preparing the propylene/higher olefin copolymers such as propylene/butene-1 copolymers. The teachings and disclosure of U.S. Pat. No. 4,259,470 are incorporated herein by reference.

The propylene/higher olefin copolymers are modified to provide acid numbers of about 5 to 20 prepared by reacting the propylene/higher olefin with an unsaturated polycarboxylic acid, anhydride or monoester thereof by processes also well known in the art, as for example, U.S. Pat. No. 3,856,889. The propylene/higher olefin reacted with this unsaturated component can be low molecular weight or degraded propylene/higher olefin copolymer. The modified propylene/higher olefin copolymer alone can be used as the polyolefin component or blends of such modified propylene/higher olefin copolymers with unmodified propylene/higher olefins or blends of modified propylene/higher olefin and blends of more than one unmodified propylene/higher olefin can also be used.

The modified propylene/higher olefin copolymers or blends of such copolymers are used in an amount of from about 70% to about 50% by weight, preferably 65% to 55%, most preferably 60%, of the adhesive formulation. An amount of the modified propylene/higher olefin copolymer below about 50% adversely affects the low temperature properties and an amount greater than 70% increases the bond set times greater than 10 seconds.

The tackifying resins useful in the adhesive compositions of this invention have Ring and Ball softening points of about 95° C. to about 135° C. and can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such particularly suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These commercially available hydrocarbon tackifying resins typically exhibit a Ring and Ball softening point of from about 125° C. to about 130° C.; an acid number of from about 0 to 2; an acid value of less than about 1; and an iodine value of from about 75–100.

Also suitable resins and rosin esters are the terpene polymers having the suitable Ring and Ball softening point such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

The hydrocarbon resins and polyterpene tackifying resins can be used either alone or in combination. These tackifying resins can be used in amounts of about 20 percent to about 35 percent by weight of the adhesive composition, preferably about 25 to about 30 percent by weight. If the tackifier resin is used in an amount greater than 35 weight percent, the low temperature bond strength is reduced, and an amount less than 20 weight percent gives an increased bond set time.

The higher density, low viscosity polyethylene waxes useful in this invention are widely available articles of commerce and can be prepared by known techniques. These waxes are made by direct synthesis or by degrading high density polyethylene to the desired viscosity. Polyethylene waxes normally have, and should have for the present invention, melting points in the range of 105° to 140° C. and preferably in the range of 115° to 135° C. The wax has a molecular weight of about 1000 to 2500, preferably about 2000, a penetration hardness at 23° C. of about 0.1, and a melt viscosity preferably of about 5 to about 500 cp. at 150° C.

The high density polyethylene wax content of the adhesive is about 5 to 15% by weight, preferably 7.5% to 12%, most preferably 10% by weight. If the amount of wax is less than 5% by weight the set time is increased and an amount greater than about 15% by weight adversely affects the low temperature properties.

The adhesive compositions of this invention are prepared by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-t-butyl-p-hydroxybenzyl)-trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene(3,5-di-tert-butyl-4-hydroxyhydrocinnamate)methane] (Irganox 1010), lauryl stearyl thiodipropionate (Plastanox 1212), and dilauryl 3,3'-thiodipropionate (Plastanox LTDP) and 2,6-di-tert-butyl-p-cresol (BHT) and the like.

Additives such as nucleating agents, pigments, colorants, fillers, solvents, and the like can also be added to the adhesive compositions of the present invention.

The adhesive compositions of this invention, which are at least essentially 100 percent solids, have a melt viscosity in the range of 750 to 4,000 centipoise at 177° C.

The following test procedures were used to determine the properties reported in the examples which follow.

Melt viscosities of the adhesive base copolymers, high density, low viscosity waxes and the hot-melt adhesive blends were determined on a Brookfield Model RTV Thermosel viscometer using a number 27 spindle.

Test specimens for determining elevated temperature peel and elevated temperature shear strengths are prepared as follows. An adhesive strip $\frac{1}{8}$ inch wide and 2–4 mils in thickness is applied to a strip of 30 pound Kraft paper 1 inch wide by 4 inches long. The adhesive is applied across the width of the paper on the unglazed surface. A second piece of Kraft paper of the same dimensions is placed over the first piece in either a peel or shear-type bond arrangement with the unglazed surface down. The two strips are bonded on a Sentinel Model 12AS sealer using 25 psi pressure and a dwell time of 0.2 seconds. The upper and lower bars of the sealer are adjusted in temperature until slight bleed through of the adhesive through the paper is observed.

Elevated temperature peel and elevated temperature shear are determined by attaching 100 g. weights to the bonded specimens and placing those specimens in a programmable forced-draft oven. The temperature program is set so the specimens remain at a given temperature for 10 minutes for conditioning. The temperature is then increased 4° C. and held at this higher value for 10 minutes. The cycle is repeated over the desired temperature interval for testing. This is generally from about 38° C. to 138° C. Each peel and shear specimen is prepared and tested in triplicate. Elevated temperature peel is the average value where the bond fails for the three specimens minus 2° C. Elevated temperature shear is determined in a similar manner.

Room temperature peel test specimens are prepared similarly except the adhesive bead width is $\frac{1}{4}$ inch. Bond strength is determined on an Instron tensile tester with the jaws separating at the rate of 0.1 inch per minute. The force required to break the bond is determined on 3 specimens. Room temperature peel strength is the average of three tests.

Adhesion at −28.9° C. is determined by applying a $\frac{1}{8}$ inch wide bead of adhesive lengthwise to a 2 inch×8 inch piece of corrugated board and immediately bringing a second piece in contact with a 6 inch overlap and moderate hand pressure. Application temperature is 177° C. The boardstock is 200 pound burst strength corrugated board. The bonded specimens are placed in a freezer at −28.9° C. and allowed to age for 24 hours. Five test specimens are made with each adhesive. The bonds are separated by hand and a determination made as to the type of failure. An adhesive having good bonding capabilities at −28.9° C. will exhibit fiber tear (FT) on the substrate. A brittle adhesive having poor or no bonding capabilities at −28.9° C. will exhibit no fiber tear (NFT) on the substrate.

The adhesive set time is determined in the following manner using corrugated board and an adhesive tester that simulates a case sealing line. Corrugated board specimens $2\frac{1}{2}$ inches×2 inches wide are placed in the grips of the tester. The bottom specimen is cut so that the flutes are parallel to the adhesive bead with the unglazed side being bonded. All top specimens have the flutes perpendicular to the bead with the machine-glazed side being bonded since this is the manner in which the box is bonded in actual practice. The bottom specimen is moved forward at a constant speed under the melt nozzle applicator for the application of the adhesive bead and is stopped directly under the top specimen. The vertical cylinder pressure is preset at 20 psi and, after a predetermined open time, moves the top specimen downward to contact the lower specimen. Contact is maintained for a given compression time and force after which the top substrate is separated from the lower substrate by reversal of the air flow operating the vertical cylinder. The adhesive bead width before compression is adjusted by $N_2$ pressure on the hot-melt reservoir to give a width of 70 mils. Several tests are carried out at different compression times under the following conditions:

Open Time—1.0 second

Vertical Cylinder Pressure—20 psi

The shortest time required to obtain 80% of the adhesive bonds having adequate strength to provide acceptable bonding is reported as set time.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A 1-liter resin flask was fitted with an anchor stirrer, thermocouple, heating mantel, dropping funnel, condenser with a Dean-Stark trap, and $N_2$ bubbler attachment. The flask was charged with 280 grams of a propylene-butene copolymer containing 7.3 weight percent (5.6 mole percent) butene-1 and having a melt viscosity of 63,000 cp. at 177° C. The flask was purged with $N_2$ to remove air. The thermocouple was attached to a temperature controller set to operate at 200° C. When the copolymer became molten, stirring was begun and the $N_2$ bubbler attachment rearranged to maintain a $N_2$ atmosphere over the contents of the flask.

Methyl hydrogen maleate was prepared by gently heating 16.8 g. of maleic anhydride in approximately 25 ml. of methanol. To this solution of methyl hydrogen maleate, 2.26 g. of ditertiary butyl peroxide was added. The total volume of solution was 65 ml. This mixture was placed in the dropping funnel and added dropwise to the molten, stirred polymer over about a 30 minute period. About 30 minutes after the final drop of solution was added, the flask was purged with $N_2$ to remove volatile material. The methyl hydrogen maleate-grafted copolymer was poured into a silicone-lined container and allowed to cool. The product had a melt viscosity of 5375 cp. at 177° C. and an acid number of 7.4.

About 65 grams of the modified propylene/butene-1 copolymer, 29.55 grams of hydrocarbon resin tackifier having a density of 1.028 g./cc. at 21° C., melt viscosity of 2,150 cp. at 177° C., and Ring and Ball softening point of 129° C., 5 grams of a high density polyethylene wax having a density of 0.947, a Ring and Ball softening point of 118° C. and a Brookfield melt viscosity of 90 at 190° C., 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. under nitrogen. The polymer blend is stirred for one hour, or longer if necessary, to insure that the blend is homogeneous. This blend composition has a melt viscosity of 2,850 cp. at 177° C. The adhesive properties of this blend are:

| | |
|---|---|
| Elevated Temp. Peel, °C. | 90 |
| Elevated Temp. Shear, °C. | 120 |
| Room Temp. Peel, g. | 1150 |
| Adhesion at −28.9° C. | FT |
| Set Time, Sec. | 6 |

This example shows that the adhesive had both very good elevated and very low temperature properties. In addition the adhesive is fast setting and had good adhesion properties at room or ambient temperature.

EXAMPLE 2

About 60 grams of the modified propylene/butene-1 copolymer of Example 1, 29.55 grams of hydrocarbon resin tackifier of Example 1, 10 grams of the high density polyethylene wax of Example 1, 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. under nitrogen and blended and tested according to Example 1. The blend has a melt viscosity of 2500 cp. at 177° C. The adhesive properties of this blend are:

| | |
|---|---|
| Elevated Temp. Peel, °C. | 78 |
| Elevated Temp. Shear, °C. | 116 |
| Room Temp. Peel, g. | 1240 |
| Adhesion at −28.9° C. | FT |
| Set Time, Sec. | 3 |

This example shows that increasing the amount of high density wax to 10 percent improved the set time and room temperature peel strength with only a slight reduction in the high temperature properties. However, the fiber tear was excellent with more fibers and fibrous material retained on the adhesive.

EXAMPLE 3

About 55 grams of the modified propylene/butene-1 copolymer of Example 1, 29.55 grams of hydrocarbon resin tackifier of Example 1, 15 grams of the high density polyethylene wax of Example 1, 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. with stirring under nitrogen and blended and then tested according to Example 1. The blend has a melt viscosity of 2,250 cp. at 177° C. The adhesive properties of this blend are:

| | |
|---|---|
| Elevated Temp. Peel, °C. | 80 |
| Elevated Temp. Shear, °C. | 116 |
| Room Temp. Peel, g. | 1300 |
| Adhesion at −28.9° C. | FT |
| Set Time, Sec. | 3 |

This example shows that further increasing the amount of high density polyethylene wax to 15 percent still provided an adhesive having the desired combination of properties.

EXAMPLE 4

About 50 grams of the modified propylene/butene-1 copolymer of Example 1, 29.55 grams of hydrocarbon resin tackifier of Example 1, 20 grams of the high density polyethylene wax of Example 1, 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. with stirring under nitrogen and blended and then tested according to Example 1. The blend has a melt viscosity of 1,975 cp. at 177° C. The adhesive properties of this blend are:

| | |
|---|---|
| Elevated Temp. Peel, °C. | 68 |
| Elevated Temp. Shear, °C. | 128 |
| Room Temp. Peel, g. | 680 |
| Adhesion at −28.9° C. | FT |
| Set Time, Sec. | 3 |

This example shows that further increasing the amount of high density polyethylene wax to 20 percent provided an adhesive having greatly reduced room temperature peel strength.

EXAMPLE 5

A 1-liter resin flask was fitted with an anchor stirrer, thermocouple, heating mantel, dropping funnel, condenser with a Dean-Stark trap, and N₂ bubbler attachment. The flask was charged with about 280 grams of a propylene-butene copolymer containing 11.8 weight percent (9.1 mole percent) butene-1 and having a melt viscosity of 63,000 cp. at 177° C. The flask was purged with N₂ to remove air. The thermocouple was attached to a temperature controller set to operate at 200° C. When the copolymer became molten, stirring was begun and the N₂ bubbler attachment rearranged to maintain a N₂ atmosphere over the contents of the flask.

About 16.8 g. of maleic anhydride and about 2.26 g. of ditertiary butyl peroxide were added and the mixture was placed in the dropping funnel and added dropwise to the molten, stirred polymer over about a 30 minute period. About 30 minutes after the final drop of solution was added, the flask was purged with N₂ to remove volatile material. The maleic anhydride-grafted copolymer was poured into a silicone-lined container and allowed to cool. The product had a melt viscosity of 5,437 cp. at 177° C. and an acid number of 7.4.

About 60 grams of the maleic anhydride modified propylene/butene-1 copolymer, 29.55 grams of hydrocarbon resin tackifier having a density of 1.028 g./cc. at 21° C., melt viscosity of 2,150 cp. at 177° C., and Ring and Ball softening point of 129° C., 10 grams of a high density polyethylene wax having a density of 0.947, a Ring and Ball softening point of 118° C. and a Brookfield melt viscosity of 90 at 190° C., 0.1 gram of tetrakis[methylene-3-(3',5'-di-t-butyl-4-hydroxyphenyl)-propionate]methane and 0.35 gram lauryl stearyl thiodipropionate are placed in a 400 ml. beaker at 200° C. under nitrogen. The polymer blend is stirred for one hour, or longer if necessary, to insure that the blend is homogeneous. This blend composition has a melt viscosity of 2,550 cp. at 177° C. The adhesive properties of this blend are:

| | |
|---|---|
| Elevated Temp. Peel, °C. | 65 |
| Elevated Temp. Shear, °C. | 112 |
| Room Temp. Peel, g. | 1450 |
| Adhesion at −28.9° C. | FT |
| Set Time, Sec. | 6 |

This example shows that the propylene/butene copolymer can be modified with an unesterified maleic anhydride to provide modified copolymers which form adhesives also having both good high and low temperature properties.

EXAMPLE 6

About 60 grams of the maleic anhydride modified propylene/butene-1 copolymer of Example 5, 10 grams of the high density polyethylene wax of Example 1, 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. under nitrogen and blended and tested according to Example 1. The blend has a melt viscosity of 4,050 cp. at 177° C. The adhesive properties of this blend are:

| | |
|---|---|
| Elevated Temp. Peel, °C. | 34 |
| Elevated Temp. Shear, °C. | 115 |
| Room Temp. Peel, g. | 520 |
| Adhesion at −28.9° C. | FT |
| Set Time, Sec. | 8 |

This example shows that deleting the tackifier from the blend provides a drastic loss in elevated temperature and room temperature peel strength.

EXAMPLE 7

About 60 grams of the maleic anhydride modified propylene/butene-1 copolymer of Example 5, 29.55 grams of hydrocarbon resin tackifier of Example 1, 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. with stirring under nitrogen and blended and then tested according to Example 1. The blend has a melt viscosity of 3,150 cp. at 177° C. The adhesive properties of this blend are:

| | |
|---|---|
| Elevated Temp. Peel, °C. | 77 |
| Elevated Temp. Shear, °C. | 112 |
| Room Temp. Peel, g. | 1580 |
| Adhesion at −28.9° C. | FT |
| Set Time, Sec. | 30 |

This example shows that deleting the high density polyethylene wax from the blend provides an extremely long and unsatisfactory set time.

EXAMPLE 8

About 60 grams of the maleic anhydride modified propylene/butene-1 copolymer of Example 5, 29.55 grams of hydrocarbon resin tackifier of Example 1, 10 grams of a low density polyethylene wax having a density of 0.925, a Ring and Ball softening point of 111° C. and a Brookfield melt viscosity of 425 at 190° C., 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. with stirring under nitrogen and blended and then tested according to Example 1. The blend has a melt viscosity of 2,650 cp. at 177° C. The adhesive properties of this blend are:

| | |
|---|---|
| Elevated Temp. Peel, °C. | 77 |
| Elevated Temp. Shear, °C. | 112 |
| Room Temp. Peel, g. | 1810 |
| Adhesion at −28.9° C. | FT |
| Set Time, Sec. | 11 |

This example shows that substituting a low density polyethylene wax for the high density polyethylene wax in the blend provides an almost 100 percent increase in the set time which is unsatisfactory.

EXAMPLE 9

Example 1 was repeated except that a propylenebutene copolymer containing 15.1 weight percent (11.8 mole percent) butene-1 and having a melt viscosity of 6,810 cp. at 177° C. was used. The methyl hydrogen maleate grafted copolymer had a melt viscosity of 6,810 cp. at 177° C. and an acid number of 6.4.

About 60 grams of the modified propylene/butene-1 copolymer, 29.55 grams of hydrocarbon resin tackifier having a density of 1.028 g./cc. at 21° C., melt viscosity of 2,150 cp. at 177° C. and a Ring and Ball softening point of 130° C., 10 grams of a high density polyethylene wax having a density of 0.947, a Ring and Ball softening point of 118° C. and a Brookfield melt viscosity of 90 at 190° C., 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. under nitrogen. The polymer blend is stirred for one hour, or longer if necessary, to insure that the blend is homogeneous. This blend composition has a melt viscosity of 3,000 cp. at 177° C. The adhesive properties of this blend are:

| Elevated Temp. Peel, °C. | 75 |
| Elevated Temp. Shear, °C. | 112 |
| Room Temp. Peel, g. | 1250 |
| Adhesion at −28.9° C. | FT |
| Set Time, Sec. | 6 |

This example shows that a propylene/butene copolymer containing twice the amount of butene-1 of the copolymer of Example 1 provides an adhesive having both very good elevated and very low temperature properties. In addition the adhesive is fast setting and had very good adhesion properties at room or ambient temperature.

EXAMPLE 10

Example 5 was repeated except that a propylenebutene copolymer containing 16.4 weight percent (12.8 mole percent) butene-1 and having a melt viscosity of 14,500 cp. at 177° C. was used in preparing the maleic anhydride modified copolymer. The maleic anhydride modified copolymer had a melt viscosity of 14,500 at 177° C. and an acid number of 5.2.

About 60 grams of the maleic anhydride modified propylene/butene-1 copolymer, 29.55 grams of hydrocarbon resin tackifier having a density of 1.028 g./cc. at 21° C., melt viscosity of 2,150 cp. at 177° C. and a Ring and Ball softening point of 130° C., 10 grams of the high density polyethylene wax having a density of 0.947, a Ring and Ball softening point of 118° C., 0.1 gram of tetrakis[methylene-3-(3',5'-di-t-butyl-4-hydroxyphenyl)propionate]methane and 0.35 gram lauryl stearyl thiodipropionate are placed in a 400 ml. beaker at 200° C. under nitrogen and blended and tested according to Example 1. The blend has a melt viscosity of 5,625 cp. at 177° C. The adhesive properties of this blend are:

| Elevated Temp. Peel, °C. | 81 |
| Elevated Temp. Shear, °C. | 106 |
| Room Temp. Peel, g. | 1470 |
| Adhesion at −28.9° C. | FT |
| Set Time, Sec. | 4 |

This example shows that a propylene/butene-1 copolymer containing an amount of butene-1 almost ten percent greater than the copolymer of Example 9 provides an adhesive having very good elevated and very low temperature properties.

EXAMPLE 11

A 1-liter resin flask was fitted with an anchor stirrer, thermocouple, heating mantel, dropping funnel, condenser and a Dean-Stark trap, and N₂ bubbler attachment. The flask was charged with about 376 grams of a propylene-hexene copolymer containing 20.3 weight percent (16 mole percent) hexene-1 and having a melt viscosity of 40,000 cp. at 177° C. The flask was purged with N₂ to remove air. The thermocouple was attached to a temperature controller set to operate at 190° C. When the copolymer became molten, stirring was begun and the N₂ bubbler attachment rearranged to maintain a N₂ atmosphere over the contents of the flask.

About 17.9 grams of maleic anhydride and about 2.08 grams of ditertiary butyl peroxide were added and the mixture was placed in the dropping funnel and added dropwise to the molten, stirred polymer over about a 15 minute period. About 10 minutes after the final drop of solution was added, the flask was purged with N₂ to remove volatile material. The maleic anhydride-grafted copolymer was poured into a silicone-lined container and allowed to cool. The product had a melt viscosity of 2,800 cp. at 177° C. and an acid number of 11.6.

About 60 grams of the maleic anhydride modified propylene/hexene-1 copolymer, 29.55 grams of hydrocarbon resin tackifier having a density of 1.028 g./cc. at 21° C., melt viscosity of 2,150 cp. at 177° C., and Ring and Ball softening point of 129° C., 10 grams of a high density polyethylene wax having a density of 0.947, a Ring and Ball softening point of 118° C. and a Brookfield melt viscosity of 90 at 190° C., 0.1 gram of tetrakis[methylene-3-(3',5'-di-t-butyl-4-hydroxyphenyl)-propionate]methane and 0.35 gram lauryl stearyl thiodipropionate are placed in a 400 ml. beaker at 200° C. under nitrogen. The polymer blend is stirred for one hour, or longer if necessary, to insure that the blend is homogeneous. This blend composition has a melt viscosity of 1,600 cp. at 177° C. The adhesive properties of this blend are:

| Elevated Temp. Peel, °C. | 59 |
| Elevated Temp. Shear, °C. | 114 |
| Room Temp. Peel, g. | 1130 |
| Adhesion at −28.9° C. | FT |
| Set Time, Sec. | 14 |

This example shows that the propylene/hexene-1 copolymer can be modified with an unesterified maleic anhydride to provide modified copolymers which form adhesives having both good high and low temperature properties.

EXAMPLE 12

An adhesive was prepared using an unmodified propylene/butene copolymer by blending about 60 grams of an unmodified propylene/butene-1 copolymer containing 18.3 weight percent (14.4 mole percent) butene-1 and having a melt viscosity of 20,500 at 177° C. and an acid number of 0, 29.55 grams of hydrocarbon tackifying resin having a density of 1,028 g./cc. at 21° C., melt viscosity of 2,150 cp. at 177° C. and a Ring and Ball softening point of 130° C., 10 grams of a high density polyethylene wax having a density of 0.947, a Ring and Ball softening point of 118° C. and a Brookfield melt viscosity of 90 at 190° C., 0.1 gram of tetrakis[-methylene-3-(3',5'-di-t-butyl-4-hydroxyphenyl)propionate]methane and 0.35 gram lauryl stearyl thiodipropionate are placed in a 400 ml. beaker at 200° C. under nitrogen and blended and tested according to Example 1. The blend has a melt viscosity of 6,750 cp. at 177° C. The adhesive properties of this blend are:

| | |
|---|---|
| Elevated Temp. Peel, °C. | 58 |
| Elevated Temp. Shear, °C. | 103 |
| Room Temp. Peel, g. | 1010 |
| Adhesion at −28.9° C. | FT |
| Set Time, Sec. | 14 |

This example shows that an adhesive blend formed from similar propylene/butene-1 copolymers, but which are unmodified provide an adhesive blend having substantially decreased elevated and room temperature peel properties and an unacceptable set time when compared with an adhesive blend formed from the modified copolymer.

The invention has been described in detail with particular reference to preferred embodiments thereof, but it will be understood that variations and modifications can be effected within the spirit and scope of the invention.

I claim:

1. A hot-melt adhesive composition having a viscosity of about 750 to about 4,000 cp. at 177° C. and a set time of less than about 10 seconds which provides bonds having good low and high temperature properties comprising a blend of
    (a) about 70 to 50 percent by weight of at least one modified propylene/$C_4$ to $C_{10}$ higher 1-olefin copolymer prepared by reacting the propylene/higher olefin with an unsaturated polycarboxylic acid, anhydride or monoester thereof and containing 95 to 70 mole percent having an acid number of at least 5 and having a melt viscosity of 1,500 to 20,000 centipoise at 177° C.,
    (b) about 20 to about 35 percent by weight of at least one tackifier resin selected from the group consisting of hydrocarbon resin and polyterpene resins having a softening point of about 95° C. to about 135° C., and
    (c) about 5 to about 15 percent by weight of a high density, low viscosity polyethylene wax having a melt viscosity of about 5 to 500 cp. at 150° C. and melting point of about 105° C. to 140° C.

2. A hot-melt adhesive composition according to claim 1 wherein said modified propylene/higher olefin copolymer is a modified propylene/butene-1 copolymer having a viscosity of 1,500 to 20,000 cp. at 177° C. and containing 95 to 70 mole percent propylene.

3. A hot-melt adhesive composition according to claim 2 wherein said tackifier resin is a hydrocarbon tackifier resin having a density of 1.028 g./cc. at 21° C., a melt viscosity of 2,150 cp. at 177° C., and a Ring and Ball softening point of 130° C.

4. A hot-melt adhesive composition according to claim 3 wherein said modified propylene/butene-1 copolymer has a viscosity of 1,550 cp. at 190° C. and a saponification number of about 17.5.

5. A hot-melt adhesive composition according to claim 4 wherein said high density, low viscosity polyethylene wax has a melt viscosity of about 800 and a melting point of about 125° C.

6. A hot-melt adhesive composition having a viscosity of about 900 to about 4,000 cp. at 177° C. and a set time of less than about 10 seconds which provides bonds having good low and high temperature properties comprising a blend of
    (a) about 65 to 60 percent by weight of at least one modified propylene/$C_4$ to $C_{10}$ higher olefin copolymer having an acid number of about 5 to 20 prepared by reacting the propylene/higher olefin with an unsaturated polycarboxylic acid, anhydride or monoester thereof and having a melt viscosity of 1,500 to 20,000 centipoise at 177° C. containing 85 to 75 weight percent propylene,
    (b) about 30 to 25 percent by weight of at least one tackifier resin selected from the group consisting of hydrocarbon resin and polyterpene resins having a Ring and Ball softening point of about 125° C. to about 135° C., and
    (c) about 10 percent by weight of a high density, low viscosity polyethylene wax having a melt viscosity of about 90 to 500 cp. and a melting point in the range of 90° C. to 135° C.

7. A hot-melt adhesive composition according to claim 6 wherein said modified propylene/higher olefin copolymer is a modified propylene/butene-1 copolymer having a viscosity of 1,550 to 10,000 cp. and containing 70 to 95 mole percent propylene.

8. A hot-melt adhesive composition according to claim 7 wherein said tackifier resin is a hydrocarbon tackifier resin having a density of 1.028 g./cc. at 21° C., a melt viscosity of 2,150 cp. at 177° C., and a Ring and Ball softening point of 130° C.

* * * * *